C. OVERLY.
STRAINER.
APPLICATION FILED FEB. 7, 1917.

1,255,215.

Patented Feb. 5, 1918.
3 SHEETS—SHEET 1.

Inventor
CHARLES OVERLY
Fisher & Elliott
Attorneys

C. OVERLY.
STRAINER.
APPLICATION FILED FEB. 7, 1917.

1,255,215.
Patented Feb. 5, 1918.
3 SHEETS—SHEET 2.

Inventor
CHARLES OVERLY
By Fisher ~~~~
Attorneys

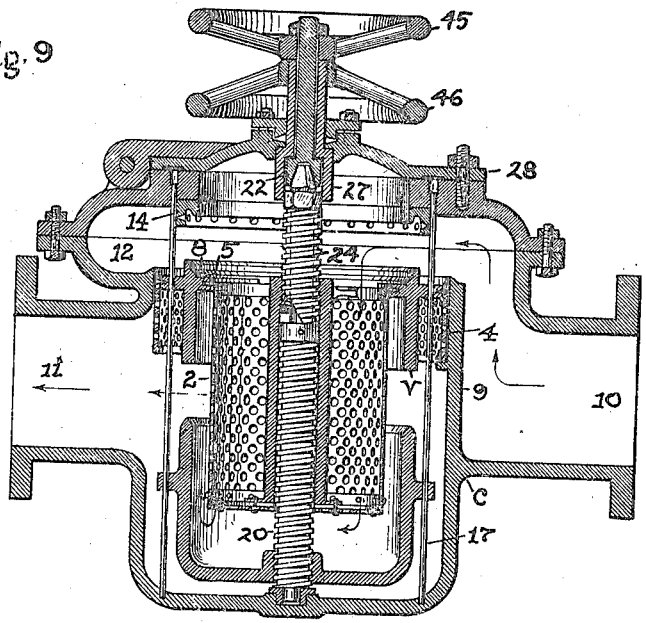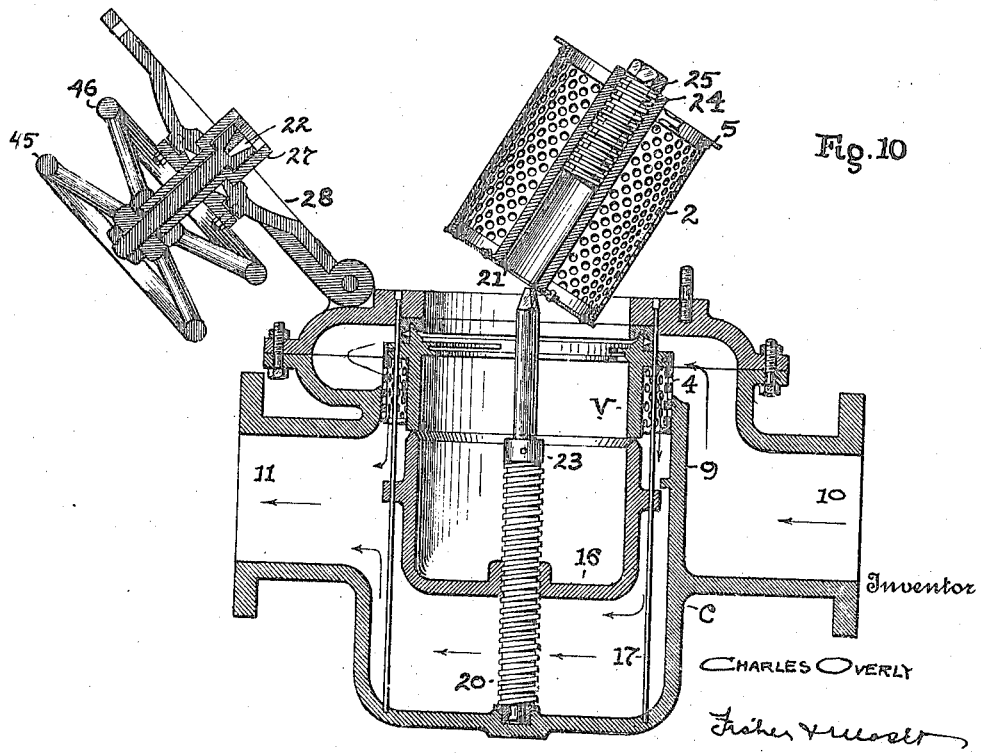

UNITED STATES PATENT OFFICE.

CHARLES OVERLY, OF CLEVELAND, OHIO.

STRAINER.

1,255,215.  Specification of Letters Patent.  Patented Feb. 5, 1918.

Application filed February 7, 1917. Serial No. 147,038.

*To all whom it may concern:*

Be it known that I, CHARLES OVERLY, citizen of the United States, residing at Cleveland, in the county of Cuyahoga and State of Ohio, have invented certain new and useful Improvements in Strainers, of which the following is a specification.

This invention has reference to an improvement in strainers adapted to be used in connection with water conduits to remove the larger particles of whatever solid matter may be carried by the water, all substantially as shown and described and particularly pointed out in the claims.

Figure 1:
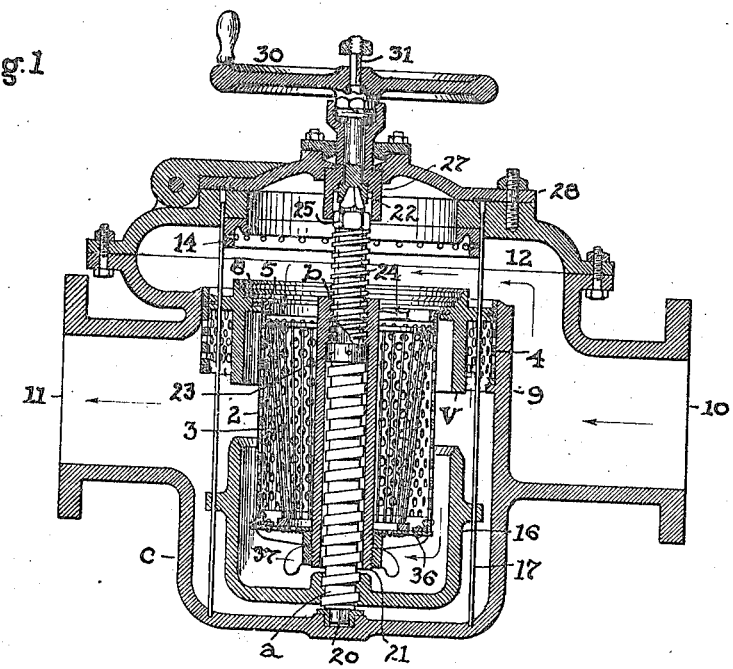
Figure 2:
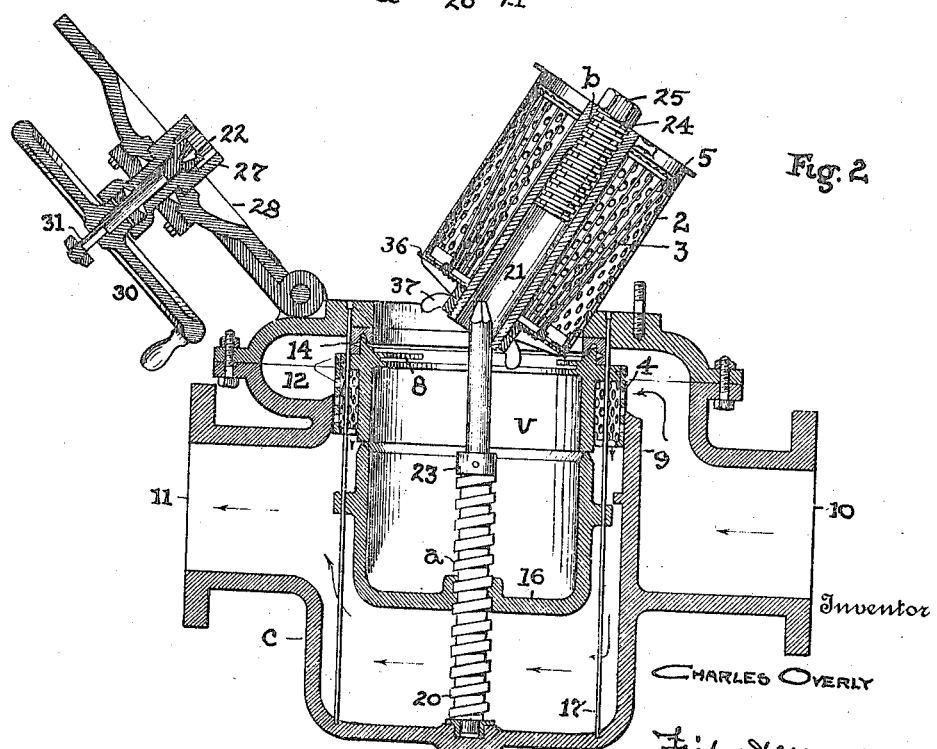

In the accompanying drawings, Figure 1 is a sectional elevation of a complete strainer installation with the parts in working position. Fig. 2 is a sectional elevation corresponding to Fig. 1, but with the strainer opened and the basket raised for removal and cleansing.

Figure 3:
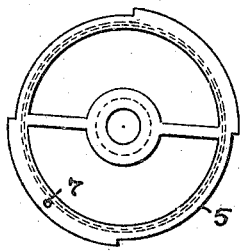
Figure 4:
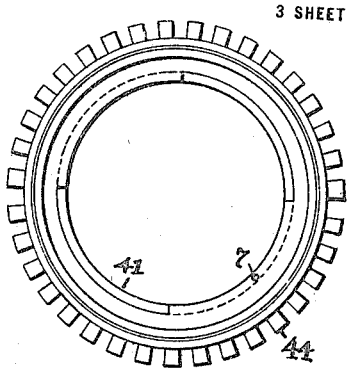
Figure 5:
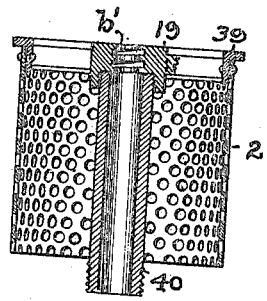
Figure 6:
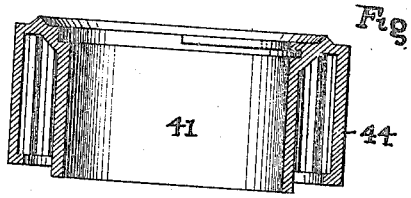
Figure 7:
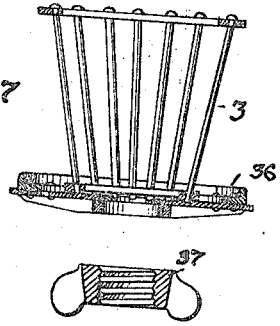
Figure 8:
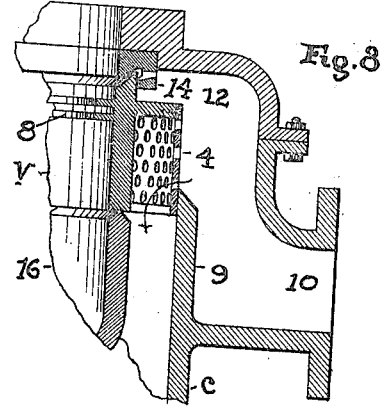

Figs. 3 to 8, Sheet 2, are details or modifications of parts shown in the foregoing views. Thus, Fig. 3 is a plan view of a collar or spider engaged with the top of the strainer basket and adapted to be removably locked over the flange of the valve to secure the basket in place, and Fig. 4 is a plan view of the style of valve shown in Fig. 6. Fig. 5 is a sectional elevation of the perforated strainer basket and a modification of said collar or spider. Fig. 6 is a modification of the main or upper valve and showing an integral outside strainer mechanism. Fig. 7 is a detail of an inside wire strainer or crib to intercept leaves and the like and adapted to be seated in the main basket and secured therein by a nut also shown. Fig. 8 is an enlarged sectional elevation of the structure shown in Fig. 2 and with the parts in the same position as in said figures and with the external strainer open.

Fig. 9, Sheet 3, is a sectional elevation of a modification of Fig. 1, and Fig. 10 is a sectional elevation of the said modification and with the parts otherwise in the relation shown in Fig. 2 and as hereinafter fully described.

The strainer as a complete article of manufacture and sale comprises all the parts shown in the respective views 1, 2, 9 and 10, according to the form used, and in either case, or in any modification of the invention other than herein shown, the invention comprises a casing $c$ with a water passage through the same and a main valve $v$ set into said passage and a single perforated strainer basket 2, also referred to as an internal strainer, supported internally of said valve. An auxiliary strainer 3, preferably made of a series of substantially parallel wires or rods, is adapted to be placed in the said basket to intercept the larger floating matter, such as leaves or the like, and a so-called external basket or strainer belt 4, is shown as built about and upon the said annular or tubular main valve $v$.

Structurally and in detail the said several parts comprise certain distinct features, such as a collar 5, Fig. 3, fixed to the top of basket 2 and which rests rotatably and removably on an inside flange on valve $v$ and under confining lips 8 above the same and with which the said collar is interlocked by a substantially bayonet-joint action or its equivalent, and a quarter turn beneath the flange 8 will bring openings 7 in register to receive a pin to fix the basket in position.

The external strainer belt 4 is built about the outside of valve $v$ and has its outer wall slidably mounted within the surrounding annular wall 9 of the casing $c$. The said wall 9 need have no further definition than to say that it has an overflow all around for the water into the strainer 2, and forms a working bearing for valve $v$ within the same, the inlet to said casing being at 10 and the exhaust at 11 and the passage of the water over the top of wall 9 into the said strainers 2 or 4, as one or the other is exposed. The annular water space 12 above the wall 9 is under constant water supply and in one case the flow is downward through strainer 2 and thence out through exhaust 11, and in the other case, when valve $v$ is closed and basket 2 is out for cleansing, the flow is through the outside or belted strainer 4, Fig. 2.

The valve $v$ has a tapered edge about its top adapted to project into an annular groove or channel in a seating ring 14 fixed within the top of the casing $c$, and said ring has an outer down flange provided with a series of perforations in its side next below said groove to permit a limited quantity of water to flow through the same in cleansing relations to said valve seat so as to insure a perfect closure of the valve when the valve enters said groove or channel. This closes the water passage through the valve $v$ and basket 2, but at the same time opens the by-pass through the strainer belt 4 and renders necessary additional means to close off the water from valve $v$ and its basket as both parts are still open at the bottom. To this end I provide the auxiliary cup-shaped valve or member 16. This valve or member, like the valve $v$, is slidable up and down on the guide rods 17, common to both valves and secured at their ends in casing $c$, and both said valves having outside flanges or ribs perforated to engage said rods, and the lower valve is adapted to seat its upper edge in water sealing relation against the lower edge of the upper valve $v$ while the upper or main valve has the strainer 4 built beneath the said flange with a perforated sheet metal band and an open bottom flange through which the water passes.

The said valves are operatively related for opening and closing the water passage through valve $v$ and also for the outer strainer 4, and the means for this purpose comprise a central screw threaded shaft or spindle 20, which is rotatably seated in the bottom of casing $c$ and provided with a relatively quick thread $a$, engaged in the bottom of valve 16 to raise and lower the same and otherwise projecting upward through a central tube 21 depending from collar 5 through the basket 2 and into the top of the main casing, where the angular extremity of said shaft or spindle is adapted to be engaged by a key or wrench 22 having a confined but rotatable position in the top or cover of the casing.

Incidentally, the upper inner portion of the said tube 21 has an internal thread $b$ in its upper end about half the pitch of the thread $a$ on shaft 20 and which thread is engaged by a screw sleeve 24 mounted on or over the smooth spindle shaped upper end of shaft 20 next above the thread $a$ and a collar 23 fixed on said shaft at the top of said thread fixes the limit of rotation downward of said sleeve. The said screw sleeve 24 is the direct means for raising and lowering the valve $v$ and the strainers therewith as a unitary structure or combination, and whereby said valves are opened and closed for the purposes already described. Being raised as in Fig. 2, the said parts are also removable together.

Such rotation of sleeve 24 is effected by engaging the angular nut shaped head 25 thereon by means of the tubular wrench 27 rotatably mounted in the hinged top or cover 28 of the main casing, and the upper end of wrench 27 is enlarged to contain a packing ring and it is also made with an angular bore above the packing ring to receive the angular sided hub of hand wheel 30 when said wheel is lowered for this purpose. Otherwise, or when the lower valve controlling shaft 20 is to be independently rotated, the said hand wheel is lifted out of engagement with wrench 27 and operatively engages only the reduced angular stem 31 on the top of the shaft engaging wrench 22 above described and which is confined centrally in the tubular wrench 27. In other words, when the hand wheel is up and free from wrench 27 it engages only the angular stem 31 on wrench 22 and is adapted to operate shaft 20 independently, the said shaft being free to rotate in screw sleeve 24, but when said wheel is lowered and socketed within the head of tubular wrench 27 the upper valve $v$ also comes under control and the two valves and the several strainers on or in valve $v$ are simultaneously raised. Hence, if the parts are say in the relation shown in Fig. 1, and it is desired to remove and cleanse the strainer, the hand wheel 30 is lowered into engagement with wrench 27 which controls valve $v$ and the strainers thereon, and the wrench 22, which has its head inclosed within the lower end of wrench 27, is depressed and engaged onto the faced end of shaft 20, so that when the hand wheel is rotated it will turn both wrenches and the valves engaged thereby will be bodily raised to closing position, Fig. 2.

It will be noticed in this operation that the lower valve not only has to move upward across the intervening space between said valves seen in Fig. 1, but plus the raise given to the upper valve through screw sleeve 24, and hence the necessity for greater pitch or quicker thread $a$ as compared with thread $b$ on said sleeve nut. When said valves and parts are thus raised to their limit the inner strainer is closed to the water and the outer strainer opened thereto, and the operator can approach and remove said inner strainer by first releasing the cover or top 28 and swinging it to one side on its hinge and which carries the two wrenches 22 and 27 and the hand wheel with it. The threads $a$ are cut, say, to one-half pitch and the threads $b$ to one-fourth so that they will work in harmony and provide such travel in each as is required for harmonious proportionate joint opening and closing of the valves.

The inner basket or crib 3, adapted to intercept the larger foreign particles as above described, is shown in Fig. 7 and has an open bottom frame 36 seated within basket 2 and engaged over the end of tube 21 and confined by a nut 37 on the end of said tube.

Fig. 5 shows a collar or spider 39 of modified construction as compared with collar 5 in Figs. 1 and 2, in that it has the bridge portion 19 provided with a thread $b'$ in its middle opening corresponding to thread $b$ in pitch and a separate tube 40 fixed therein in lieu of integral tube 21.

The valve 41, Fig. 6, is a modification of valve $v$ in Fig. 1 in that it has an outer integral wall for the outer strainer 4 and parallel vertical bars 44 instead of a perforated plate, but this is an obvious equivalent.

Figs. 9 and 10 show a modification in the means for operating the strainers and valves, there being two hand wheels 45 and 46, one for operating each of the respective wrenches 22 and 27, instead of a single wheel, and in this case the screw thread for sleeve 24 may be of the same pitch as the screw thread on shaft 20.

Some of the several advantages obtained by the invention may be enumerated about as follows: first, the joint and simultaneous movement of the strainers to open one and close the other; second, the joint or separate movement of the valves to open or closed positions; third, the cleansing of dirt or accumulations from the upper valve seat preparatory to closing by the perforated valve seat; fourth, the joint operation of the valves and the strainers, whereby the service of the strainers is exchanged by opening or closing the valves; and fifth, the simple way of holding and detaching the main or basket strainer from the valve $v$ for removal from the casing.

The term "strainer" is used in some of the claims to designate both the strainer elements 2 and 4.

What I claim is:

1. A strainer, comprising a casing having a cleaning port and a water passage, a main valve member to prevent the flow of water through said port, a plurality of concentric strainer members jointly supported for movement with said valve member within said passage and an auxiliary valve member to control the flow of water independently through the inner strainer member.

2. A strainer casing having a cleaning port in its top and a main water passage, a strainer basket removably mounted within said passage opposite said port, and valve means for controlling the passage and said port having a belt strainer member encircling said basket and mounted to move therewith to intersect said passage upon closing said port by said valve means.

3. A strainer casing having a cleaning port and a fluid passage, valve means to close either said port or said passage, and a pair of concentric strainer members comprising a basket and a belt to guard said passage when said port is either open or closed.

4. A strainer casing having a cleaning port and a valve seat, a tubular valve member slidably mounted within said casing and adapted to engage said seat, a strainer basket and strainer belt mounted upon said member, and means to press said member to said seat.

5. A strainer casing and a tubular valve member slidably mounted therein having a flange, a strainer belt secured to said flange, and a strainer basket removably supported within said member.

6. A strainer casing having a water passage through the same and an opening in its top, a tubular valve member slidably mounted within said casing, a valve seat surrounding said opening adapted to seat said member, a strainer basket removably mounted upon said valve member and a strainer ring encircling said member and affixed thereto.

7. A strainer, comprising a casing and a tubular valve member slidable therein, a strainer basket removably engaging the top of said member, and a separate strainer member fixed about the outside of said valve member having an open bottom, and means to raise said member and both strainers jointly.

8. A strainer casing having a cleaning port and a water passage, a pair of valve members mounted opposite said port and each other, a strainer basket supported internally and a strainer belt externally of one of said members, and means to raise said valve members and strainers to different positions relatively to said port and passage.

9. A strainer casing having a fluid passage through the same and a covered opening at its top, and a tubular valve movable across said passage and adapted to close said top opening from within the casing and having a strainer basket and a strainer ring fixed thereon and movable therewith.

10. A strainer, comprising a casing having a water passage and a top opening, a valve in said passage comprising a ring member and a cup member and screw means to seat said ring member within the casing about said top opening, and a strainer basket carried by said ring member and inclosed thereby and by said cup member.

11. A strainer having a casing with a cleaning port in its top and a fluid passage, a valve member in said passage, guides on which said valve is slidable across said passage, and a seat for said valve in the top of said casing surrounding said port, in combination with a strainer basket carried by said valve and removable therefrom through said port in the top of said casing.

12. A strainer having a casing with a water passage through the same, a ring-shaped valve member slidably mounted in said casing and in said passage and a seat therefor in the upper portion of said casing, the said casing having a cleaning port through the same within said seat and a cover removably fixed over said opening, and a strainer basket detachably engaged with the said valve member and removable through said opening.

13. A strainer casing having a main water passage and a cleaning port in its top, a valve slidably mounted within said passage opposite said port and provided with a strainer belt, a seat for said valve in the top of said casing surrounding said port, and means to close said valve and seat said strainer belt across said passage.

14. A strainer casing having a cleaning port in its top, a ring-shaped valve member and means to raise and lower said member therein to close said port, in combination with a strainer basket having a detachable interlocking connection with said member and removable therefrom through said port.

15. A strainer casing having a water passage through the same and a cleaning port in its top, a main valve member mounted in said passage opposite said port having strainer means affixed thereto, an auxiliary valve member co-acting with said main valve member in cutting off the flow of water through said strainer means, in one position of said main valve member, and means to operate both valve members to change their positions relatively to each other and said port.

16. A strainer casing having a pair of valve members slidably mounted therein on the same axis and means to operate said valves to control the flow of water through said casing, in combination with a strainer basket and a strainer belt carried by one of said members.

17. A strainer device having a cleaning port and a valve seat surrounding it, a main valve member having a strainer belt fixed thereon and an inner strainer basket removably engaged therewith and depending therefrom, a cup-shaped valve member movably mounted to seat against the main valve member, and means to seat both valve members to cut off the passage of water through said strainer basket.

18. A strainer, comprising a main casing having a main water passage, two valve members therein oppositely related to close the main passage, one of said members having a set of strainers supported thereon, and screw means having screw threads of different pitch for operating said members and strainers.

19. A strainer casing having a cleaning port and a main water passage, a cover and a main valve member coöperating with said port, a strainer basket detachably affixed to said valve member and an auxiliary strainer crib removably seated concentrically within said basket.

20. A strainer, comprising a ring-shaped main valve member having flanges on the inside thereof, in combination with a strainer basket having means about its top to interlock with said flanges.

21. A strainer casing having a cleaning port and a set of co-acting valve members to close said port, a screw to operate each valve member, and strainer means within said casing connected with said valve members.

22. A strainer casing having a cleaning port and a cover therefor, a set of valve members to close said port to permit removal of the cover, strainers within said casing, and operating means for said valve members extending through said cover and separably engaged with said valve members.

23. A strainer casing having a water passage therethrough and a cleaning port, a cover for said port and valve means to close said port to permit the cover to be displaced, a strainer basket removably seated centrally within said valve means, and screw means extending through said cover to operate said valve means.

24. A strainer casing having a water passage and a cleaning port, a cover for said port, a main valve member and an auxiliary valve member to close said port, a strainer basket detachably supported within said main valve member, screw-threaded members to operate said valve members and means carried by said cover to operate said screw-threaded members.

25. In a strainer device as described, a strainer basket having a screw-threaded tube centrally affixed thereto, in combination with a screw member engaged within said tube.

26. A strainer casing having a water passage therethrough and a cleaning port in its top, a cover for said port having a pair of valve operating members extending in sleeved connection through said cover, a main valve member and an auxiliary valve member within said casing for said port, a strainer basket and a strainer belt to guard said passage, and separate screw devices detachably connected with said operating members and operably connected with said valves to raise and lower the same relatively to said port.

27. A strainer casing having a water passage and a cleaning port in its top, a cover for said port, a ring-shaped valve member slidably mounted opposite said port having a strainer belt encircling the same, a cup-shaped valve member in co-acting seating relation at the bottom of said ring-shaped member, a screw to raise and lower said cup-shaped valve member, a strainer basket detachably affixed to said ring-shaped member having a screw-threaded central part, a screw sleeve for said part in separable engagement with the said screw, and means carried by said cover having separable and operable connection with said screw and screw sleeve.

Signed at Cleveland, in the county of Cuyahoga, and State of Ohio, this 3d day of February, 1917.

CHARLES OVERLY.

Copies of this patent may be obtained for five cents each, by addressing the "Commissioner of Patents, Washington, D. C."